US009531791B2

(12) United States Patent
Friese et al.

(10) Patent No.: US 9,531,791 B2
(45) Date of Patent: Dec. 27, 2016

(54) CONTROL MODULE FOR A SIGNAL TRANSMITTER FOR A REMOTE-CLIENT DISPLAY OF A SEQUENCE OF MEDICAL IMAGES

(71) Applicant: SIEMENS AKTIENGESELLSCHAFT, Munich (DE)

(72) Inventors: Thomas Friese, Munich (DE); Christian Fritzsche, Nuremberg (DE); Hans-Martin Von Stockhausen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 609 days.

(21) Appl. No.: 13/867,206

(22) Filed: Apr. 22, 2013

(65) Prior Publication Data

US 2014/0032646 A1    Jan. 30, 2014

(30) Foreign Application Priority Data

Jul. 24, 2012    (DE) ........................ 10 2012 212 923

(51) Int. Cl.
*G06F 15/16*    (2006.01)
*H04L 29/08*    (2006.01)
(Continued)

(52) U.S. Cl.
CPC ............. *H04L 67/10* (2013.01); *G06F 3/1431* (2013.01); *H04L 67/12* (2013.01); *H04L 67/38* (2013.01);
(Continued)

(58) Field of Classification Search
CPC ................................ H04L 67/10; H04L 29/08
(Continued)

(56) References Cited

U.S. PATENT DOCUMENTS 7,724,260 B2    5/2010 Hancock et al.
2007/0283400 A1*  12/2007 Lee ........................ H04N 7/10
                                                    725/107
(Continued)

FOREIGN PATENT DOCUMENTS

DE          10229342 A1    1/2004

OTHER PUBLICATIONS

Mohammed Sabah Dr.; Developing ubiquitous medical imaging information system standard; pp. 39-50; www.iadis.net; IADIS Virtual Multi Conference on Computer Science and Information Systems; 2005; CA.
(Continued)

*Primary Examiner* — Arvin Eskandarnia
(74) *Attorney, Agent, or Firm* — Harness, Dickey & Pierce

(57) ABSTRACT

A system, a method and a computer program product for monitoring a screen configuration process for a sequence of medical images on a remote client are disclosed. In at least one embodiment, a central server includes a rendering module and a marker generator in order to mark the sequence of images to be displayed as a DESIRED sequence of images and transfer it to the remote client. In addition to a remote-client application, an observer module and a warning signal transmitter are provided on the remote client. The observer module is used to compare the DESIRED sequence of images with the ACTUAL sequence of images. In the event of a lack of conformity, the warning signal transmitter issues a warning signal on the remote-client monitor.

12 Claims, 1 Drawing Sheet

(51) Int. Cl.
*H04L 29/06* (2006.01)
*G06F 3/14* (2006.01)

(52) U.S. Cl.
CPC .... *G09G 2350/00* (2013.01); *G09G 2370/022* (2013.01); *G09G 2380/08* (2013.01)

(58) Field of Classification Search
USPC .......................................................... 709/203
See application file for complete search history.

(56) References Cited

U.S. PATENT DOCUMENTS

2010/0162338 A1* 6/2010 Makhija ............. H04N 21/2402
    725/114
2012/0254397 A1* 10/2012 Zaringhalam ......... H04L 49/101
    709/224
2013/0061091 A1* 3/2013 Moore ................ G06F 11/1443
    714/18

OTHER PUBLICATIONS

Digital Imaging and Communications in Medicine; DICOM supplement 123; Structured Display; pp. 1-35; Verion: Final Text; 2008; US; Oct. 27, 2008.
German Office Action dated Aug. 8, 2016.

* cited by examiner

CONTROL MODULE FOR A SIGNAL TRANSMITTER FOR A REMOTE-CLIENT DISPLAY OF A SEQUENCE OF MEDICAL IMAGES

PRIORITY STATEMENT

The present application hereby claims priority under 35 U.S.C. §119 to German patent application number DE 102012212923.5 filed Jul. 24, 2012, the entire contents of which are hereby incorporated herein by reference.

FIELD

At least one embodiment of the invention generally relates to screen configuration processes in a remote-client environment, wherein a predefined sequence of images, in particular medical images are to be displayed on the remote client.

Hence, at least one embodiment of the invention lies within the fields of electronics and medical engineering and relates to the rendering of image sequences on remote monitors.

BACKGROUND

As elsewhere, in the field of medical engineering, the current trend in the resolution of problems related to information technology favors the use of centralized processes, in particular cloud computing. In such cases, complex processes, applications and also hardware and application-specific services are provided at a central point on specialized computers which clients connected thereto are able to access. Hence, the main computing effort and demands on resources occur centrally on the server and hence the connected clients can be embodied very thinly and simply (as so-called "thin clients").

Also known is the use of remote computers or clients to display screen content. In such cases, for example, an application for calculating technical drawings (for example in the field of architecture) with corresponding plans or image data runs on the server and the drawings to be displayed are displayed on a remote client. This, for example, offers the advantage that the applications can be adapted more flexibly to the respective use case. The user (for example the architect) can then access the image data and view them from mobile devices (for example including from remote workstations or even from the user's Smartphone at the building site). Solutions of this kind are also known as remote-desktop solutions and are commercially available, for example, from the company Microsoft (for example Remote Desktop/RemoteFX). Other products are, for example, VMWARE View, Citrix Receiver.

However, the field of medical engineering has the problem that the aforementioned remote-desktop products cannot be used since there are special regulations and requirements relating to the evaluation of medical image data sets. For example, in the context of image-supported diagnostics there is a requirement to ensure that, in the case of a sequence of image data, in principle all image data sets in the sequence of images are displayed on the monitor. In other words, it must be possible to ensure that a sequence of images is always displayed completely on a remote monitor. This is not possible with the remote-desktop systems known hitherto from the prior art. It is not possible to provide an additional control of the display of the screen content on the remote computer.

In this context, it has been found to be problematic that it is not always possible to provide sufficient bandwidth for the connection between the server and the connected remote clients. If, therefore, it is only possible to provide a connection with low bandwidth by way of example (for example due to a poor mobile radio connection), as a rule, remote-desktop systems work on the basis of only transferring part of the data packets to the client. For medical engineering applications, this means that not all images in an image sequence are displayed on the remote display device but, for example, "interim images" to be displayed for a short period only are left out of the display to optimize the data transmission. However, with the systems available hitherto according to the prior art, the client is not able to monitor whether all images in a sequence of images have been displayed. This is not possible, since so-to-speak the "benchmark" is missing on the client and hence the client regularly does not have data and information at its disposal in order to perform this monitoring. This also results in an inability to control the quality and completeness of the images displayed on the remote client. In practice, the result of this is that previous systems and products from the prior art cannot be used for clinical evaluations on a remote-client basis.

SUMMARY

At least one embodiment of the present invention provides a solution with which the previous systems can be improved with respect to quality, broadband utilization and/or flexibility. At least one embodiment of the present invention provides for at least one of improvement and expansion of control and monitoring options for the client in a remote-desktop environment for the display of image sequences.

Alternative embodiments of the invention are described in the subclaims.

Embodiments of the invention are described below with reference to the system. Embodiments, alternative features and advantages mentioned here can also be transferred to other solutions or to the other claims (that is to the method and the computer program or the computer program product) and vice versa. Consequently, the features or subclaims claimed or described in connection with the system can also be developed with the features of the system and/or of the product and vice versa. Here, the respective functional features of the method are implemented by corresponding microprocessor components or processor modules or hardware modules embodied to implement or execute the respective functions.

According to one example embodiment of the invention, a system is provided for monitoring and controlling a screen configuration process for a sequence of images on a remote client in a remote-client environment. Here, at least one central server is provided to which a plurality of remote clients can be connected.

A method is further disclosed for monitoring and/or control of a screen configuration process and in particular of a screen configuration process for configuring a screen content comprising a sequence of images. Firstly, the server renders a screen display, comprising a sequence of images.

A computer program product is also disclosed. A computer program comprising computer instructions is also disclosed. The computer instructions are stored on a memory of a computer and comprise commands that can be read by the computer, which are intended to execute the above-described method when the commands are executed on the computer. The computer program can also be stored on a storage medium, it can be implemented in a graphics card and/or it can be downloaded via a corresponding network from a server. The computer program can also be provided in the context of a cloud solution.

BRIEF DESCRIPTION OF THE DRAWINGS

The following detailed description of the figures discusses, with reference to the drawing, exemplary embodiments, which should not be understood as restrictive, with their features and further advantages. The figures show.

DETAILED DESCRIPTION OF THE EXAMPLE EMBODIMENTS

Figure 1:
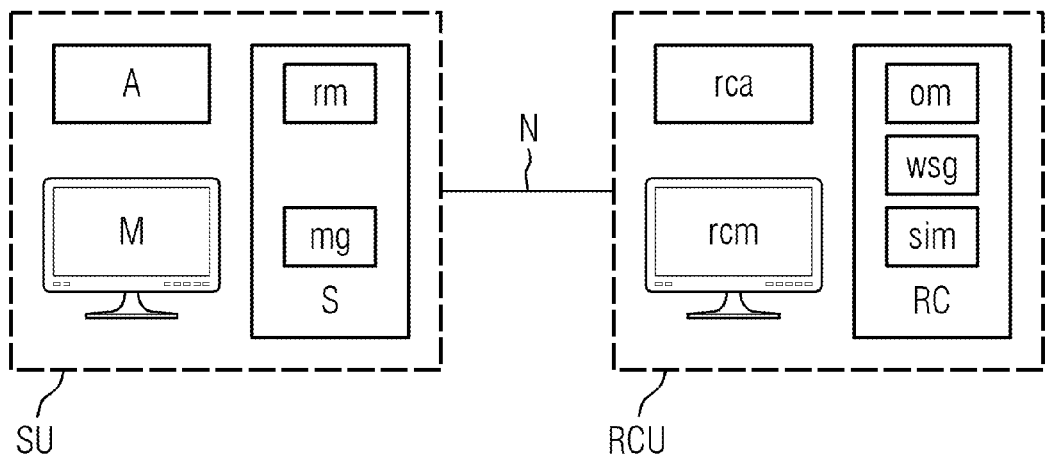
FIG. 1 shows an overview of a schematic display of a monitoring system according to the invention according to an example embodiment and FIG. 2 a flow diagram of a method according to the invention according to an example embodiment.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to one example embodiment of the invention, a system is provided for monitoring and controlling a screen configuration process for a sequence of images on a remote client in a remote-client environment. Here, at least one central server is provided to which a plurality of remote clients can be connected.

A process or an application for rendering a screen display comprising a sequence of images runs on the central server. The rendering is performed by a rendering module.

The central server also comprises a marker generator, which is intended to insert a marker in every image in the sequence of images to be displayed. The marker can either be integrated directly in the image in the sequence of images or uniquely connected thereto in another way. Here, the marker is selected in each case such that the totality of all markers uniquely marks a sequence of the images of the sequence of images to be displayed. In other words, it is possible to derive from the read-out marker signals whether all images in the sequence of images are displayed completely and in the correct sequence. According to an example embodiment, it is provided that marker signals are integrated in the sequence of images to be displayed at the server side. Hence, these marker signals signal a DESIRED sequence of images, that is a target sequence of images, which is to be displayed on a (remote) display device. In the later course of the monitoring process, it is then possible to compare this DESIRED sequence of images identified by the received marker signals with an ACTUAL sequence of images for conformity at the client side.

In an embodiment, the system also comprises at least one remote client. Usually, in this context, a whole information-technology environment is designated a remote client. Therefore, in addition to the actual computer or a group of computers, the remote client also comprises other devices, such as, for example a remote-client monitor. A remote-client application, which is intended to receive the signals provided by the server for displaying the screen content is installed on the computer of the remote client. In particular, the remote-client application is used to receive the output signals as provided by the rendering module of the server.

The remote client also comprises an observer module embodied to monitor the output from the remote-client application. In particular, there is a requirement to monitor whether the sequence of images to be displayed on the remote-client monitor was also completely displayed. To this end, the observer module executes a sequence of commands and operational steps.

In particular, the observer module detects the currently displayed ACTUAL sequence of images as was actually displayed on the remote-client monitor. To this end, preferably three possibilities are used:

1. The graphics memory of the system is read out and evaluated directly (this approximately corresponds to scanning the screen, comparable to the creation of "screenshots").

2. A separate (virtual) graphics driver is provided (frame buffer). The result of all rendering applications is written locally into this memory which displays the contents and also provides it to the observer module.

3. Integration with the remote client: if the remote client has an output-memory, this is read-out and monitored in this way.

The ACTUAL sequence of images is then compared with the DESIRED sequence of images for conformity. The DESIRED sequence of images can be extracted from the marker signals which the remote-client application has received from the server.

According to an example embodiment, the observer module is installed in addition to the remote-client application and as a separate module on the remote client. Alternatively, however, the observer module can also be integrated in the remote-client application or interact with this via an additional data link.

The remote client also comprises a warning signal transmitter, which is intended, in the event of a lack of conformity between the ACTUAL sequence of images and the DESIRED sequence of images to generate a warning signal and output it on the remote client.

The following defines terms used in the context of this application in more details.

The screen configuration process is a process which generates output signals from which then—on one or more remote client(s)—a representation or a reproduction of the respective screen content can be generated.

In the case of this application, the screen content to be displayed is preferably restricted such that a sequence of images is always to be displayed. In other words, the screen content contains one or more image sequences which are to be displayed in specific segments on the user interface. Preferably, this involves medical image data, which are relevant for the medical evaluation. However, alternative embodiments envisage other medical image data (for example graphical representations of laboratory values) or image data with a non-medical content. The image data can be two-dimensional or higher-dimensional and acquired by different modalities (for example imaging modalities, such as, for example, ultrasound, PET, MRT, CT etc.). Depending upon the choice of embodiment of the invention, different rendering modes (or projections), such as, for example, VRT, MPR, MIP etc. can be used for the projection of the higher-dimensional data on the 2D image segments.

The server and/or the remote client are computers, computer networks (for example cloud systems), which, depending upon the embodiment, can comprise still further modules and processors. The server is preferably embodied as a central server on which the compute-intensive processes and services run or are provided. The remote client computers are preferably simple devices, which as a rule have little computing power. The clients are able to exchange data via a wireless data link (for example mobile radio network) or via a wire-bound data link with the central server.

The server's rendering module and marker generator also exchange data. The output signals from the rendering module are sent to the remote client and in particular to the remote-client application. Here, it is essential that the marker generator enriches the output of the rendering module with the marker before the image is transmitted to the client application (and hence to the remote client). The remote-client application can also be implemented as a process or as a hardware solution in the form of a microprocessor chip module. The observer module is preferably implemented in the remote-client environment and in particular on the remote-client computer. According to one embodiment of the invention, the observer module can be a software and/or a hardware module. Alternatively, the observer module can also be embodied as an external module on another computer which exchanges data with the remote client.

The warning signal transmitter can be a hardware and/or software module, which in particular emits optical warning signals on the remote-client monitor if the observer module has established that the sequence of images to be displayed could not be completely displayed. Alternatively or cumulatively, it is also possible for other (for example acoustic) warning signals to be output here.

As explained above, in the example embodiment, the marker is an optical marker. This can for example be represented by a circle, with individual circle segments, wherein every image in the sequence of images corresponds to a circle segment of the circle. Hence, successive images in the sequence of images correspond to successive circle segments of the circle or successive images in the sequence of images are hence marked by successive circle segments. If, therefore, all circle segments of the circle are displayed, this indicates that all images in the sequence of images could also be displayed. Otherwise (i.e. when the display of the sequence of images is not complete), the circle will also not be completely reproduced. However, this possibility of representing the image sequence is only an example and other representations of the sequence of images are also possible within the context of the invention.

For example, it is also possible to indicate the individual images in the sequence of images and then store these indices together with the respective image in the sequence of images and to transfer them to the remote client for the output signal of the respective screen display. The indices can then be used by the remote-client application to analyze the ACTUAL sequence of images. It is also possible to execute the additional control function of the image sequence display on the remote client without optical marker signals and with purely digital marker signals. The invention also includes combinations of the two aforementioned possibilities. However, it is essential that the marker signals, on the one hand, are automatically generated and introduced into the images and, on the other, automatically read out of the data sent to the remote client for the screen configuration and processed.

As soon as the observer module has established by corresponding signal processing that the ACTUAL sequence of images does not conform to the DESIRED sequence of images or the sequence of images to be displayed could not be displayed completely (if, for example, two successive images have a gap between the embedded circle segments), the warning signal transmitter issues a warning signal. This is preferably a warning signal represented optically or graphically on the user interface. Preferably, a warning window is generated on the screen of the remote client referring to the defective display. This warning window can cover the other screen displays. Alternatively, the warning signal can also be embodied as a (for example colored) highlighted frame drawn around the sequence of images in question. This enables the quality of the remote evaluation to be significantly increased, in that the user at the remote monitor is informed immediately of an incomplete or defective display of the sequence of images to be displayed. The quality of the evaluation process can subsequently also be improved.

According to one example embodiment, the observer module is provided as a separate module in addition to the remote-client application on the remote client. This has the advantage that the observer module can automatically and independently detect and signal every deviation from the DESIRED sequence of images. Hence, manipulations on the remote-client application can be reliably excluded. In addition, the observer module can also execute the correct display independently of physical parameters of the remote-client monitor. For example, the synchronization of the screen content can be matched to the refresh rate of the respective monitor (vertical and horizontal image repetition rate) which in turn can possibly result in an incomplete display of image sequences. Here, once again advantageously according to the invention, it is possible to ensure independent control of the monitoring process of the screen configuration process on the remote client.

According to a further example embodiment, a separate and/or additional communication channel for data exchange can be provided between the observer module and the remote-client application. The additional channel can be embodied as a direct network connection. Alternatively, it is possible to embed an additional marker for this additional information in the image to be transferred. In this case, therefore, two different markers would be embedded in the image in the sequence of images and transferred by rendering application to the remote-client application. This enables the observer module to be provided with additional status data which is relevant in the context of the screen configuration process. For example, user interactions or hardware parameters or other measuring signals can influence the monitoring process. This data is then fed to the observer module, which is then able to process it in the context of the monitoring. This enables the reliability of the system to be increased overall. In this case, therefore, the remote client also has a status information module which is intended to detect status information and/or layout information, which is relevant in the context of the screen configuration process and forward it to the observer module for processing. Preferably, it can be determined in an upstream configuration phase which status and layout information can be collected here. It is also possible to configure how this status and/or layout information should be included during the monitoring of the observer module.

In an example embodiment of the invention, it is provided that the markers are embedded in a specific position in the respective image in the sequence of images, namely in a marker region, which is in particular located "at the bottom right" in the image. This has the advantage that the screen configuration process on the remote client can be monitored in an additional respect for a complete display of the image. In particular in the case of CRT monitors, under some circumstances, display errors can occur which are, for example, caused by an excessive number of images (for example an image frequency which exceeds the monitor's display capacities (for example the refresh rate)). In particular, when interlacing is used, in certain circumstances, although a first part of the image is configured on the monitor, the rest of the image is missing. Since the screen content is generally configured in lines from the top left to the bottom right, the positioning of the monitoring symbol at the bottom right is a distinct point and much more suitable than, for example, positioning at the top left at which these errors would not then be detected. However, due to the memory layout, this positioning of the marker (at the bottom right) in the image is also advantageous when using LCD/LED-monitors. This special arrangement of the markers in the image enables a further implicit possibility for monitoring the displayed sequence of images for completeness on the remote client to be exhausted.

A method is further disclosed for monitoring and/or control of a screen configuration process and in particular of a screen configuration process for configuring a screen content comprising a sequence of images. Firstly, the server renders a screen display, comprising a sequence of images.

Following this, marker signals are generated, which uniquely identify the image sequence. Preferably, the marker signals can mark a plurality of sequences per layout and/or a sequence per segment. These marker signals are coupled to the individual images in the sequence of images. A sequence of images is hence uniquely assigned to a sequence of markers (inter alia in the sense: image 1—marker 1, image 2—marker 2, image n—marker n).

Then, an output signal is generated to display the screen content on a (remote-client) monitor. In this case, the output signals also comprise the generated marker signals and the necessary RGB signal portions and any synchronization signals, which are then written to a memory. The output signals are read from this memory and prepared for transfer.

It is essential that the incorporation or embedding of the markers in the image takes place automatically and/or temporally before the output signals (in particular the rendering-output signals) are sent to the remote client.

Hence, after output signals have been sent to the remote-client application, the latter receives information on the configuration of the screen content and information on the DESIRED sequence of images. Preferably, the received signals are written to a local memory on the remote client. The received marker signals can then be extracted from the received signals at the client side and forwarded to the observer module for monitoring. Alternatively, the marker signals are also stored (separately). Following this, the observer module can then initiate a monitoring process, in which the ACTUAL sequence of images is compared with the DESIRED sequence of images for conformity.

If the monitoring process signals an incomplete display of the sequence of images on the remote client, a warning signal is automatically output on the remote client.

With this method, it can advantageously be achieved that it is possible to ensure that the sequence of images to be displayed on a remote client was also displayed completely there. This enables the statutory requirements in the field of medical engineering to be fulfilled. In addition, it is possible to avoid manipulations affecting the incomplete representations on the remote client.

The method or the control system can also be implemented as hardware in the graphics card. The method and the system can also be integrated as an embedded system in an evaluation system.

It is also possible for individual portions of the above-described method to be embodied as individual saleable units and the remaining portions of the method as other saleable units. This enables the method according to an embodiment of the invention to be performed as a divided system on different computer-based instances (for example distributed on client and on server in stances). It is, for example, possible for the application and the remote-client application to comprise different submodules which are implemented partially on the client, partially on the server and/or partially on other computer-based instances.

A computer program product is also disclosed. A computer program comprising computer instructions is also disclosed. The computer instructions are stored on a memory of a computer and comprise commands that can be read by the computer, which are intended to execute the above-described method when the commands are executed on the computer. The computer program can also be stored on a storage medium, it can be implemented in a graphics card and/or it can be downloaded via a corresponding network from a server. The computer program can also be provided in the context of a cloud solution.

The following explains the invention in more detail with reference to FIG. 1. This describes an example embodiment, but this can be modified without leaving the scope of protection of the present application.

Embodiments of the invention relate to a system, a method and a computer program or a computer program product for monitoring and/or controlling a screen configuration process on a remote client RC in a remote-client environment RCU, wherein an image sequence is to be displayed on the remote client RC, whose screen configuration process on the remote client RC is to be controlled and/or monitored.

To this end, a central server S interacts with one or more remote clients RC via a corresponding data interface, which can be wire-bound or wireless.

In FIG. 1, the server S is shown schematically on the left with individual modules and, on the right-hand side of FIG. 1, the remote client RC is also shown with further modules.

Since both the server S and the remote client RC relate more to an information-technology environment than to an individual singular computer or computing device, the two entities in FIG. 1 are shown with a dashed line. This is to make it clear that further modules and instances can be connected to the server environment SU and the remote client environment RCU. The server S shown on the left-hand side interacts via a network connection N with the remote client RC shown on the right-hand side.

The server S comprises a rendering module rm, a marker generator mg and a monitor M.

The remote client RC comprises at least one remote-client application rca, at least one remote-client monitor rcm, one observer module om and a warning signal transmitter wsg. Optionally, the remote client RC can also comprises a status (and layout) information module sim. To this end, the remote client RC comprises a remote-client monitor rcm.

A complex and, as a rule, resource-intensive application A for rendering the screen content is executed on the server S; this is done by the rendering module rm, which generates the signals, which are used to control the monitor M. The signals contain all the information needed to control and draw the pixels or subpixels.

According to an embodiment of the invention, the screen content to be displayed or drawn comprises a sequence of images of medical image data. This can, for example, be a series or a study of CT or MRI other types of images of a patient, which are to be displayed on the remote client RC for the purposes of evaluation.

According to an embodiment of the invention, it is now provided that the sequence of images to be displayed is not simply sent from the rendering module rm to the remote-client environment as is the case with the previously known method according to the prior art, but an additional module is provided on the server S, namely the marker generator mg, which is intended to apply markings on the sequence of images to be displayed such that later the markings enable the order of the sequence of images to be extracted exactly. In other words, the marker generator mg is used to this end to define a DESIRED sequence of images of which the display is to be checked.

Hence, according to an embodiment of the invention a data packet is compiled comprising output signals of the rendering module rm for rendering of screen and marker signals, which identify the respective sequence of images. This data packet is transmitted from the server S to the remote client RC.

The remote client RC is then able to receive and extract the data packet.

To this end, the output data from the rendering module rm is used to configure the screen content according to the server-side specifications on the remote-client monitor rcm.

The remote client RC is also able to extract the DESIRED sequence of images from the marker data from the data packet. The DESIRED sequence of images determined in this way is forwarded to the observer module om for the purposes of monitoring.

The observer module om preferably performs a plurality of steps:

Firstly, it detects the concrete sequence of images displayed on the remote-client monitor rcm as the ACTUAL sequence of images. Preferably, this is performed automatically by reading out the graphics memory and processing the read-out data. Alternatively, an additional (separate) graphics driver with a buffer can be provided into which the rendered contents are written or the observer module om can be integrated in the remote-client application rca.

The observer module om is preferably also embodied locally on the remote client RC and can now compare the ACTUAL sequence of images with the DESIRED sequence of images for conformity.

In the event of a lack of conformity or other errors, the observer module om issues a corresponding (error) signal to the warning signal transmitter wsg, which signals on a surface of the remote-client computer rcm that the image display could not be displayed in the intended sequence or in the required quality.

In an advantageous development of an embodiment of the invention, the status and information module sim is additionally provided on the remote-client computer in order to forward further signals and/or data with respect to the image display to the observer module om and to process them.

The status information module sim is, for example, used if it is intended to change between different screen contents (for example the patient depicted or a study/series of a patient are changed). Then the marker also "jumps" back to the previous display or the marker so-to-speak changes with the respective image content. This status information or layout information is provided on the remote-computer RC by an application or a processor component, which is either integrated in the actual remote-client application rca or also started there as an external observer process.

The status information module sim can be provided separately as an additional module on the remote client RC. Alternatively, the status information module sim can also be integrated in the remote-client application rca.

The warning signal transmitter wsg can also be embodied as an external, separate module on the remote client RC or it can alternatively be integrated in the remote-client application rca.

Figure 2:
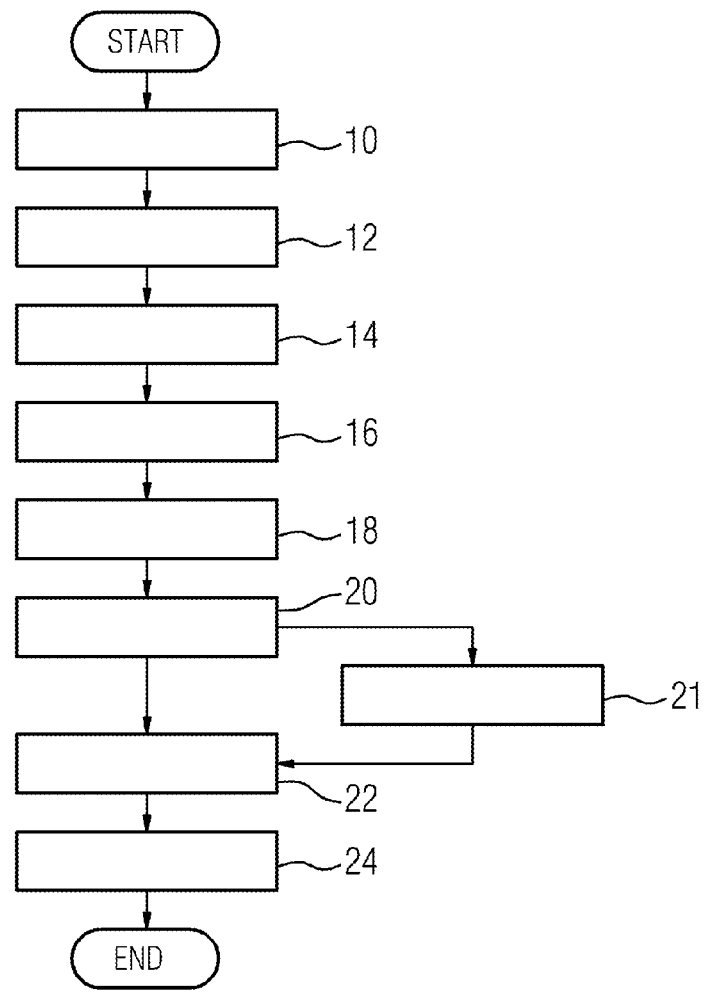

The method according to an example embodiment will be described in more detail in the following with reference to FIG. 2.

The method comprises a plurality of method steps.

In a first step, the screen display is rendered. This is indicated in FIG. 2 with the reference number 10. The screen display comprises a sequence of images. This is usually performed on the server S. In this context, the server S defines how the sequence of images is to be displayed and hence defines a DESIRED sequence of images.

Then, in step 12, marker signals are generated. Here, each image in the sequence of images is uniquely assigned to a marker in a sequence of markers. The markers are preferably, integrated directly in the screen display. Hence a sequence of images corresponds in a unique way to a sequence of markers, preferably graphically represented markers. The markers are preferably connected inseparably with the respective images. According to one aspect of the invention, therefore, not only the control signals for the image display are transmitted to the remote client RC, but a data packet is also generated, which, in addition to the image configuration control signals, also contains marker signals. These are generated for every image in the sequence of images.

In step 14, output signals are generated, which are used to draw (render) the respective screen display. According to one aspect, the screen display comprises a sequence of images. Otherwise, an image in the sequence of images can in each case represent an individual screen display. In this case, the method is performed iteratively for each new screen display (for every image in the sequence of images). The output signals are used for the display on the remote-client monitor rcm. The output signals comprise the marker signals and hence also a representation of the DESIRED sequence of images.

In step 16, the output signals are transported to the remote client RC for the screen configuration. This can for example be performed with packet-oriented data transmission.

The remote client RC then receives the output signals in step 18. This is preferably performed by way of the remote-client application rca.

Then, in step 20 the screen display(s) can be calculated in order to display the sequence of images on the remote-client monitor rcm.

When the screen sequence has been displayed on the remote-client monitor rcm, the ACTUAL sequence of images is detected and forwarded to the monitoring or observer module om.

Alternatively, in an additional step 21, a status and information module sim can be interrogated in order to obtain status and layout information relating to the rendering or user interactions on the monitor and/or related thereto. This step relates to the processing of layout and interaction signals of the remote-client computer and the forwarding of the signals detected thereby to the observer module om for the purposes of monitoring. This enables interaction signals of the user on the remote client RC or further signals, which are relevant for the screen display (for example the monitor's image repetition rate etc.) to be taken into account in the screen display.

In step 22, the monitoring and/or control of the screen display on the remote-client monitor rcm takes place. Here, in particular, the monitoring for completeness of the displayed sequence of images is performed. This takes place on the basis of the transferred marker signals, which can be extracted from the received output signals. The observer module om can compare the ACTUAL sequence of images with the DESIRED sequence of images for conformity.

If conformity is not complete or other errors could be determined, in step 24, a warning signal is output by the warning signal transmitter wsg on the part of the remote client RC.

Following step 24, the method is finished or repeated once more.

It is essential that all the steps of the method are executed automatically and without user interaction. This enables the reliability of the monitoring to be increased; manipulations by manual interventions can also be excluded.

As described numerous times above, the screen display comprises a sequence of images. To this end, the screen display can be calculated iteratively for all individual images in the sequence of images. Accordingly, a sequence of output signals is also forwarded to the remote client RC. Alternatively, the individual screen displays, which result from the display of the sequence of images, can also be combined to form a screen display packet, which is then transported collectively to the remote client RC.

Preferably, steps 10, 12, 14 and 16 are performed on the central server S, while the remaining steps 18 to 24 are performed on the remote client RC.

To summarize, an embodiment of the invention can be described as the monitoring of the screen sequence rate during the display of image phases on a remote client RC for completeness in that, for each image phase or for every image in the sequence of images, an optical marker is embedded in a marker region at the bottom right of the image and sent to the remote client RC for the purposes of monitoring. The rendering signals, which are written as output signals in a frame buffer or in a memory region of the graphics card and read out from there, hence also comprise the marker signals, which are then used on the remote client for monitoring the displayed sequence of images.

Finally, reference is made to the fact that individual modules can be both software and hardware modules and the example embodiments should, in principle, not be understood as restrictive with respect to a specific physical implementation of the invention. For a relevant person skilled in the art, it is in particular evident that the invention can be implemented partially or completely distributed in software and/or hardware and/or on a plurality of physical products—in this case, in particular also computer program products.

What is claimed is:

1. A system for monitoring a display of a sequence of images, the system comprising:
   a central server configured to, integrate a marker in every image in the sequence of images so that a totality of markers define a desired sequence of images; and
   at least one remote client, including a processor configured to,
   central server,
   display the output on a monitor,
   monitor the output to determine, independent of physical parameters of the at least one remote client, whether an actual sequence of images displayed on the monitor is in conformity with the desired sequence of images based on the markers, and
   issue a warning signal on the at least one remote client upon determining that the actual sequence of images is not in conformity with the desired sequence of images.

2. The system of claim 1, wherein the sequence of images is associated with at least one medical image data set and includes at least one of two or multi-dimensional image data sets, image data sets from different imaging modalities and a plurality of image data sets to be displayed in different segments of the monitor.

3. The system of claim 1, wherein the marker is an optical marker that uniquely identifies a corresponding one of the sequence of images.

4. The system of claim 1, wherein the warning signal comprises at least one optical signal which is output on the monitor of the at least one remote client.

5. The system of claim 1, wherein the processor is configured to detect every deviation from the desired sequence of images automatically.

6. The system of claim 1, wherein the processor is further configured to,
   detect at least one of a status and layout information of the monitor of the at least one remote client, and
   utilize the at least one of the status and layout information in monitoring the output.

7. The system of claim 1, wherein the central server is configured to position the marker in a marker region of a corresponding image in the sequence of the images.

8. The system of claim 7, wherein the central server is configured to position the marker at a bottom right in a corresponding image in the sequence of images.

9. The system of claim 1, wherein the screen configuration process is an image sequence rate of the screen configuration process.

10. A method for monitoring a display of a sequence of images, said method comprising:
    generating a marker signal for every image in the sequence of images so that a totality of markers define a desired sequence of images;
    generating output signals, the output signals including the markers;
    sending the output signals to a remote client to be displayed on a remote-client monitor of the remote client;
    monitoring the output signals at the remote client to determine, independent of physical parameters of the remote client, whether an actual sequence of images displayed on the remote-client monitor is in conformity with the desired sequence of images based on the markers; and
    issuing a warning signal on the remote-client monitor upon determining that the actual sequence of images is not in conformity with the desired sequence of images.

11. A non-transitory computer readable medium having computer-readable instructions stored therein, which when executed by a processor, cause the processor to execute the method of claim 10.

12. The method of claim 10, wherein the method monitors a rate of the display of the sequence of images.

* * * * *